3,503,967
PROCESS FOR THE PREPARATION OF 7 - [α-(4 - PYRIDYLTHIO)ACETAMIDO]CEPHALOSPORANIC ACID
Herbert Horatius Silvestri, Syracuse, and David Aaron Johnson, Fayetteville, N.Y., assignors to Bristol-Myers Company, New York, N.Y., a corporation of Delaware
No Drawing. Filed Aug. 26, 1968, Ser. No. 755,444
Int. Cl. C07d 99/24
U.S. Cl. 260—243    1 Claim

ABSTRACT OF THE DISCLOSURE

7-[α-(4-pyridylthio)acetamido]cephalosporanic acid and related compounds having the same side chain and the pharmaceutically acceptable salts thereof are valuable antibacterial agents for use in mammals, including man. This disclosure relates to a new and improved process for the preparation of such compounds, an example of which comprises reacting 7-aminocephalosporanic acid with 4-pyridylmercaptoacetyl chloride hydrochloride.

BACKGROUND OF THE INVENTION

Field of the invention

This invention relates to a process for the preparation of 7-[α-(4-pyridylthio)acetamido]cephalosporanic acids; the compounds are useful as antibacterial agents.

Description of the prior art

The cephalosporin literature contains many examples of procedures for the acylation of 7-aminocephalosporanic acid amongst which are U.S. Patents 3,079,314; 3,117,126; 3,140,282; 3,322,749; 3,322,750; 3,335,136 and 3,365,449 and British Patents 932,644; 957,570; 959,054 and 1,073,-996.

SUMMARY OF THE INVENTION

The present invention relates to an improved process for the preparation of compounds having the formula

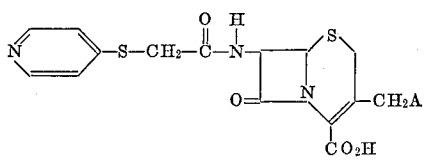

in which A is hydrogen or acetoxy, and the pharmaceutically acceptable nontoxic salts thereof.

This invention relates to a process for the preparation of synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria and, more particularly, relates to certain 7 - [α - (4 - pyridylthio)acetamido]cephalosporanic acids, related salts and derivatives thereof.

Antibacterial agents in the past have proven highly effective in the therapy of infections due to either Gram-positive or Gram-negative bacteria but few are effective against both. It was the objective of the present invention to provide an improved process for the preparation of certain compounds effective against both Gram-positive and Gram-negative bacteria including resistant strains.

The objects of the present invention have been achieved by the provision, according to the present invention, of the process for the preparation of the compound having the formula

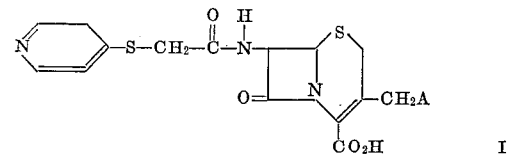

wherein A is hydrogen or acetoxy (which is preferred) and the pharmaceutically acceptable, nontoxic salts thereof; which comprises mixing a compound having the formula

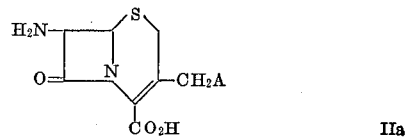

wherein A is as described above, with an acid halide having the formula

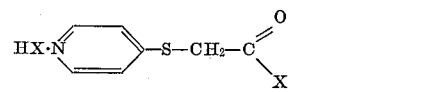

in which X is chloro, bromo or iodo, but preferably chloro, in a molar ratio of at least one mole of acid halide hydrohalide per mole of compound IIa, but preferably in a ratio of 1.0 to 1.4 moles of acid halide per mole of compound IIa, in an organic solvent selected from the group comprised of methylene chloride, dichloroethane, ethyl acetate, chloroform, or the like, but preferably methylene chloride, in the presence of an excess of tertiary amine such as pyridine, triethylamine, trimethylamine, or the like, but preferably triethylamine, and preferably in a ratio of at least 3 moles of tertiary amine per mole of acid halide hydrohalide, at a temperature in the range of about −25° C. to +35° C., but preferably about −5° C. to +5° C.

A preferred embodiment is the process for the preparation of the compound of the formula

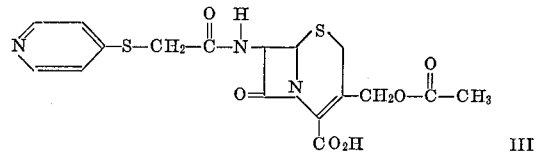

which comprises mixing a compound of the formula

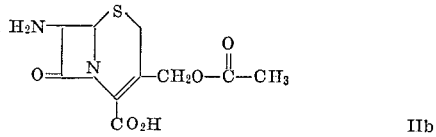

with the acid chloride hydrochloride of the formula

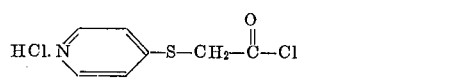

in a molar ratio of 1.0 to 2.0 moles of acid chloride hydrochloride per mole of Compound IIb, in an inorganic solvent in the presence of at least three moles of tertiary amine per mole of acid chloride hydrochloride, at a temperature in the range of −10° C. to about +25° C.

The pharmaceutically acceptable, nontoxic 4-carboxylic acid salts include such metallic cations as sodium, potassium, calcium and aluminum, and organic amine cations such as triethylamine, procaine, dibenzylamine, N-benzyl-β-phenethylamine, 1-ephenamine, N,N′-dibenzylethylenediamine, dehydroabietylamine, N,N′-bis-dehydroabietylethylenediamine, N-(lower)alkylpiperidines, e.g. N-ethylpiperidine, and other amines which have been used to form salts with benzylpenicillin.

As the compounds of the present invention are capable of forming salts with acids due to their basic nitrogen functions, the compounds are in a sense amphoteric and include the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, succinate, benzoate, tartrate, fumarate, malate, mandelate, ascorbate and the like.

The starting materials used in the present invention include 7-aminocephalosporanic acid (7–ACA) and 3-methyl - 7 - aminodecephalosporanic acid. 7-aminocephalosporanic acid is prepared by hydrolysis of cephalosporin C and has the formula

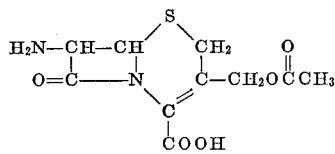

IV

3 - methyl-7-aminodecephalosporanic acid having the formula

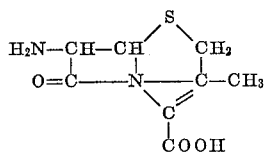

V is produced by catalytic reduction of cephalosporin C followed by hydrolytic removal of the 5-aminoadipoyl side chain as described in U.S. Patent No. 3,129,224.

In the process for the preparation of the compounds of the present invention, the compounds can be isolated from the reaction mixture by extraction into water as an acid addition salt at a pH of about 2 and then crystallized by neutralization to the isoelectric point of about pH 3.5. Addition of a water miscible solvent such as acetone sometimes enhances crystallization and further reduces solubility. The acid form can then be converted to any desired metal or amine salt, particularly the pharmaceutically acceptable, nontoxic salts described above, by treatment with the appropriate base e.g. a free amine such as procaine base or a solution of sodium 2-ethylhexanoate in dry n-butanol.

In the treatment of bacterial infections in man, the compounds prepared by the process of this invention are administered orally or parenterally, in accordance with conventional procedures for antibiotic administration, in an amount of from about 5 to 60 mg./kg./day in divided dosage, e.g., three to four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The following examples will serve to illustrate this invention without limiting it thereto. All temperatures are given in degrees Centigrade.

In the examples below, 7–ACA represents the compound having the formula

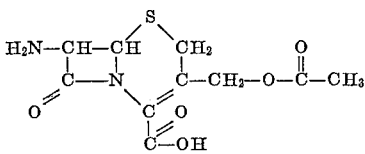

Likewise in the examples that follow, "MIC" represents the minimum inhibitory concentration in mcg./ml. of the compound required to inhibit the growth of the test organism described.

DESCRIPTION OF THE PREFERRED EMBODIMENTS.—EXAMPLE 1

(A) Preparation of 4-pyridylmercaptoacetic acid

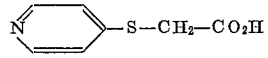

Sodium hydroxide (88.4 grams, 2.21 moles) and 600 ml. of water were added to a one liter flask fitted with a condenser. Eighty percent mercapto acetic acid (76.7 grams, 0.67 mole) was added with stirring followed by the addition of 4-chloropyridine hydrochloride (100 grams, 0.67 mole). The mixture was heated at reflux for four hours with stirring. The resultant solution was cooled to 80° C., and about 5 grams of decolorizing charcoal was added. Stirring was continued for five minutes followed by filtration through a filtering aid. The filtrate was made acid to pH 4.5 by the addition of acetic acid. The resultant slurry was cooled to 5° C. and collected by filtration. The solid was washed with 100 ml. of water. The wet cake was dissolved in 200 ml. of 6 N HCl and 500 ml. of water. The clear solution was neutralized with about 200 ml. of 10% sodium hydroxide to pH 5. The slurry was cooled to 5° C., collected on a filter and washed with 200 ml. of water. The solid was then washed with 100 ml. of isopropanol. The product, 4-pyridylmercaptoacetic acid, was dried in an oven at 50° C. to yield about 82 grams (73%), M.P. 267–268° C. (decomposition), (literature—M.P. 270° C.).

(B) Preparation of 4-pyridylmercaptoacetyl chloride hydrochloride

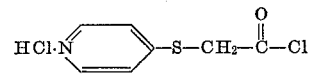

4-pyridylmercaptoacetic acid (1000 grams., 5.9 moles) was slurried in 4 liters of methylene chloride in a 50 liter vessel fitted with condenser. The slurry was saturated with dry hydrogen chloride gas for twenty minutes. The heavy slurry was stirred slowly and phosphorous pentachloride (1550 grams, 7.42 moles) was added in increments over a ten to twenty minute period. The slurry thins and after one hour an oily phase was noted as a lower layer. The oily slurry was stirred an additional hour at 25° C. The reaction mixture was warmed to slight reflux while the hydrogen chloride gas boiled off over a two hour period. The oily layer crystallized during this time. An additional thirty-four liters of dry methylene chloride was added over a two hour period with slight reflux continuing. The crystal slurry was cooled to 25° C. over a one hour period and then chilled about eight hours at 0° C. The solid crystalline material was collected by filtration and washed with methylene chloride. Precautions to protect against moisture were used. The solid cake was vacuum dried over $P_2O_5$. The product, 4-pyridylmercaptoacetyl chloride hydrochloride, was obtained in about 80% yield and is a minimum of 85% pure.

(C) Preparation of 7-[α-(4-pyridylthio)acetamido] cephalosporanic acid

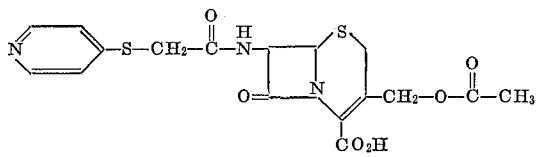

7-aminocephalosporanic acid (1000 g., 3.68 mole) was slurried in twenty-five l. of methylene chloride. The slurry was cooled to 0° C. and dry triethylamine (1780 ml., 12.7 moles.) was added to the slurry. Complete solution was obtained in about 10 minutes. The solution was chilled to −10° C. and 4-pyridylmercaptoacetyl chloride hydrochloride (950 g., 4.25 moles) was added to the reactions in increments to maintain the temperature at <5° C. The slurry was then stirred at 0° C. for 30 minutes and then at 20–25° C. for an additional hour. Ten liters of water were added to the reaction mixture and stirred for about two minutes. The pH was in the range of 7.3 to 7.5. The mixture was acidified to pH 1.8–2.0 with 6 N HCl, approximately 1325 ml.

The mixture was stirred five minutes and the organic phase separated from the aqueous phase. The organic phase was re-extracted with an additional three liters of water and the aqueous phase combined. The combined aqueous phase was adjusted to pH 3.0 to 3.2 with triethylamine. After stirring for ten minutes, 250 grams of decolorizing charcoal was added and the slurry was stirred for 5 minutes. The slurry was filtered through filtering aid. Twenty-five liters of acetone was added to the aqueous solution. Crystallization commenced shortly thereafter at 20° to 25° C. The slurry was stirred for at least thirty minutes. The pH rose as crystallization occurred. An additional 15 liters of acetone were added over a one hour period as the crystallization continued. The pH eventually rose to 3.7. The slurry was cooled at 0° C. for at least three hours and the solids were collected by filtration. The filter cake was washed with 15 liters of acetone and then dried at 50° C. to remove most of the acetone, and then redried in vacuo. The solid, 7-[α-(4-pyridylthio)acetamido]cephalosporanic acid, collected weighed about 1200 grams (75%). If desired, the solid product may be recrystallized from acetone-water.

M.I.C. vs. *Diplococcus pneumoniae* plus 5% serum (dissolved in dilute aqueous sodium bicarbonate) was 0.062 mcg./ml., vs. *Streptococcus pyogenes* A9604 was 0.016 mcg./ml., vs. *Staphylococcus aureus* Smith was 0.125 mcg./ml., vs. *Staphylococcus aureus* Smith plus 50% serum was 0.2 mcg./ml., vs. *Staphylococcus aureus* BX 1633-2 (benzylpenicillin resistant) was 0.2 mcg./ml., vs. *Salmonella enteritidis* A9531 was 0.4 mcg./ml. and vs. *Klebsiella pneumoniae* A9997 was 3.2 mcg./ml.

These tests were conducted in Baltimore Biological Laboratories Antiobiotic Assay Broth.

EXAMPLE 2

Preparation of sodium 7-[α-(4-pyridylthio)acetamido]-cephalosporanate

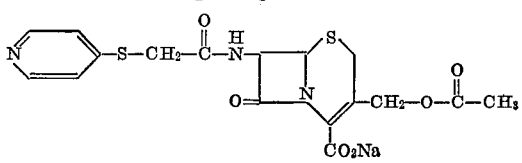

Five liters of methylene chloride were added to a clean dry vessel equipped with stirrer. 7-[α-(4-pyridylthio) acetamido]cephalosporanic acid (1000 grams) was added to the vessel, followed by 350 ml. of triethylamine. The resultant solution was treated with decolorizing charcoal for fifteen minutes and filtered. A solution of sodium-2-ethyl-hexanoate (27.3%) in butanolmethylene chloride was added to the filtrate with stirring. 7500 ml. of acetone was added. Crystallization occurred while stirring was continued several hours under dry conditions. The crystals were collected by filtration, washed with large volumes of acetone, and then dried in vacuo at 50° C. to yield about 950 grams of the title compound.

We claim:

1. The process for the preparation of the compound of the formula

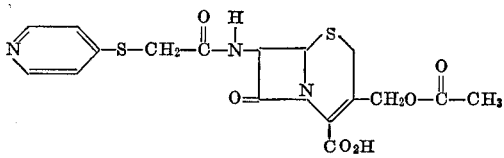

and the pharmaceutically acceptable nontoxic salts thereof; which comprises mixing a compound of the formula

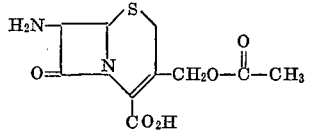

with the acid chloride hydrochloride of the formula

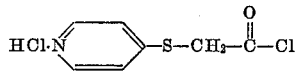

in a molar ratio of 1.0 to 1.4 moles of acid chloride hydrochloride per mole of Compound IIb,
in methylene chloride or dichloroethane,
in the presence of at least 3 moles of triethylamine per mole of acid chloride hydrochloride,
at a temperature in the range of −10° C. to +10° C.

References Cited

UNITED STATES PATENTS 3,120,514  2/1964  Doyle et al. _____ 260—239.1
3,202,653  8/1965  Cheney et al. _____ 260—239.1
3,422,100  1/1969  Crast _____ 260—239.1

NICHOLAS S. RIZZO, Primary Examiner